United States Patent
Ichikawa et al.

(10) Patent No.: US 6,334,819 B2
(45) Date of Patent: *Jan. 1, 2002

(54) MULTI-PIECE SOLID GOLF BALL

(75) Inventors: Yasushi Ichikawa; Shunichi Kashiwagi; Rinya Takesue, all of Chichibu (JP)

(73) Assignee: Bridgestone Sports Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,452

(22) Filed: Nov. 13, 1998

(30) Foreign Application Priority Data

Nov. 13, 1997 (JP) ................................................. 9-329456
Nov. 13, 1997 (JP) ................................................. 9-329457

(51) Int. Cl.[7] ........................... A63B 37/04; A63B 37/06
(52) U.S. Cl. ....................... 473/371; 473/374; 473/376; 473/377
(58) Field of Search ................................ 473/371, 374, 473/376, 377

(56) References Cited

U.S. PATENT DOCUMENTS

| 4,431,193 A | | 2/1984 | Nesbitt | |
| 4,650,193 A | * | 3/1987 | Molitor et al. | 273/228 |
| 4,683,264 A | * | 7/1987 | Urata et al. | 525/65 |
| 5,674,930 A | * | 10/1997 | Sugiura et al. | 524/404 |
| 5,730,665 A | * | 3/1998 | Shimosaka et al. | 473/376 |
| 5,779,562 A | * | 7/1998 | Melvin et al. | 473/373 |
| 5,919,100 A | * | 7/1999 | Boehm et al. | 473/354 |
| 5,997,416 A | * | 12/1999 | Maruko | 473/371 |
| 6,106,415 A | * | 8/2000 | Masutani et al. | 473/374 |
| 6,120,394 A | * | 9/2000 | Kametani | 473/378 |

FOREIGN PATENT DOCUMENTS

JP  6-343718  12/1994

* cited by examiner

Primary Examiner—Lee Young
Assistant Examiner—Rick Kiltae Chang
(74) Attorney, Agent, or Firm—Sughrue Mion, PLLC

(57) ABSTRACT

In a multi-piece solid golf ball comprising a solid core and a cover consisting of inner and outer layers, the cover inner layer is composed mainly of an ionomer resin, and the cover outer layer is composed mainly of another thermoplastic elastomer. A thermoplastic resin-base adhesive layer is interposed between the cover inner and outer layers, or a thermoplastic resin-base adhesive is blended in the inner and/or outer layer cover stock.

5 Claims, 1 Drawing Sheet

US 6,334,819 B2

MULTI-PIECE SOLID GOLF BALL

BACKGROUND OF THE INVENTION

1. Field of the Invention

This invention relates to a multi-piece solid golf ball having durability against repetitive hits, an increased distance of travel, controllability and scuff resistance.

2. Prior Art

From the past, the spin control of a ball when hit with a short iron is important for low-handicap players. It has been an outstanding task in the golf ball development work to improve the spin control of a two-piece golf ball having a cover formed of a hard ionomer resin without adversely affecting the flight distance capability inherent to the ball.

For example, U.S. Pat. No. 4,431,193 discloses a three-piece solid golf ball comprising a core, a cover inner layer formed of a hard ionomer resin, and a cover outer layer formed of a soft ionomer resin. It is intended to improve the spin rates of the ball both when hit with a driver and a short iron. This ball, however, is inferior in scuff resistance and flight distance to two-piece solid golf balls. Improvements in these respects are desired.

JP-A 343718/1994 discloses a three-piece solid golf ball comprising a cover inner layer formed of a high modulus ionomer resin having a relatively high acid content and a cover outer layer formed of a low modulus ionomer resin having a relatively low acid content or a thermoplastic elastomer exclusive of an ionomer resin. However, when the cover outer layer is formed of a thermoplastic elastomer resin, the ball can become less repulsive and less durable on account of the poor bond between the thermoplastic elastomer for the outer layer and the ionomer resin for the inner layer.

SUMMARY OF THE INVENTION

An object of the present invention is to provide a multi-piece solid golf ball having superior flight distance performance to prior art two-piece solid golf balls, durability against repetitive hits, and improved playability including control, spin and scuff resistance on short iron shots.

The invention provides a multi-piece solid golf ball comprising a solid core and a cover consisting of inner and outer layers. The cover inner layer is composed mainly of an ionomer resin containing at least 15% by weight of an α,β-unsaturated carboxylic acid. The cover outer layer is composed mainly of a thermoplastic elastomer exclusive of an ionomer resin. In one aspect, an adhesive layer composed mainly of a thermoplastic resin is interposed between the cover inner and outer layers. In another aspect, an adhesive composed mainly of a thermoplastic resin is blended in the inner and/or outer layer cover stock.

Since the adhesive or adhesive layer establishes a firm bond between the cover inner layer and the cover outer layer, the ball of the invention is significantly improved in durability against repetitive hits. When hit with a driver, the ball can travel a longer distance by virtue of a low spin rate. On approach shots with a short iron or the like, the ball is well controllable by virtue of an increased spin rate and is fully resistant to scuffing.

DESCRIPTION OF THE MAIN PARTS OF THE DRAWINGS

Figure 1:
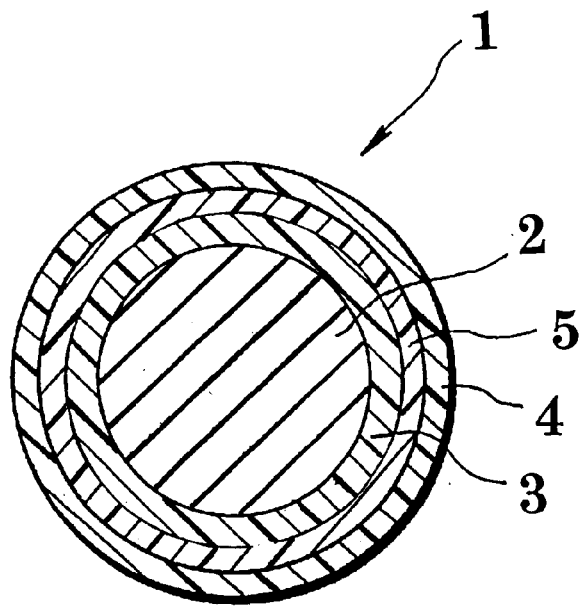
FIG. 1 is a sectional view of a golf ball according to one embodiment of the invention.

FIG. 1 is a sectional view of a golf ball 1, with a solid core 2, an inner cover layer 3, an outer cover layer 4. An adhesive layer 5 is located between the inner and the outer cover layers.

Figure 2:
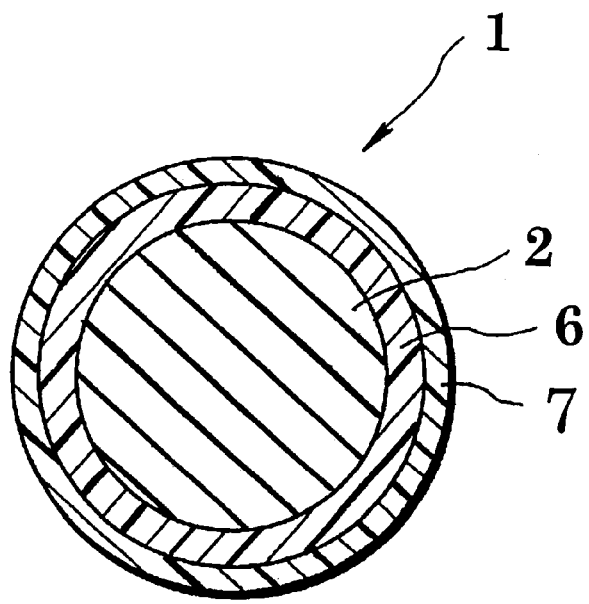
FIG. 2 is a sectional view of a golf ball according to a second embodiment of the invention.

FIG. 2 is a sectional view of a golf ball 1, with a solid core 2, an inner cover layer 6, an outer cover layer 7. One of the inner cover and/or the outer cover layers contains an adhesive blended with the cover stock.

DETAILED DESCRIPTION OF THE INVENTION

The multi-piece solid golf ball has a solid core which is enclosed with a two-layer structure cover consisting of an inner layer and an outer layer.

First, the solid core is described in detail.

The solid core may be formed of any well-known material. For example, the solid core is formed by molding under heat and pressure a well-known rubber composition comprising a base rubber, co-crosslinking agent, peroxide, inert filler, and other additives. The base rubber used herein may be polybutadiene rubber or a mixture of polybutadiene rubber and polyisoprene rubber, which are commonly used in conventional solid cores. The use of 1,4-polybutadiene rubber having at least 90% of a cis structure is preferred for the high repulsion purpose. The co-crosslinking agent used herein may be selected from conventional ones, for example, zinc and magnesium salts of unsaturated fatty acids such as methacrylic acid and acrylic acid and esters such as trimethylpropane trimethacrylate. Zinc acrylate is especially preferred for the high repulsion purpose. The co-crosslinking agent is preferably used in an amount of about 10 to 50 parts by weight per 100 parts by weight of the base rubber though the blending amount is not critical. Many peroxides are useful although dicumyl peroxide or a mixture of dicumyl peroxide and 1,1-bis(t-butylperoxy)-3,3,5-trimethylcyclohexane is preferred. The peroxide is preferably blended in an amount of about 0.5 to 1.5 parts by weight per 100 parts by weight of the base rubber. The inert fillers include zinc oxide, barium sulfate, silica, calcium carbonate, and zinc carbonate. Most often, zinc oxide or barium sulfate is used. The amount of the filler blended is appropriately determined. It is recommended that zinc oxide blended account for at least 30% by weight of the entire filler. In the core composition, there may be blended additives such as antioxidants if desired.

A solid core is prepared from the above rubber composition by well-known methods, for example, by kneading the ingredients in a kneader such as a Banbury mixer or roll mill, placing the material in a core mold, and heating the material at a sufficient temperature for the co-crosslinking agent and peroxide to function, thereby curing the material.

Preferably, the solid core is formed to a diameter of 27 to 40 mm, especially 32 to 39 mm, a weight of 10 to 35 grams, especially 15 to 32 grams, and a deflection of 2.5 to 5.5 mm, especially 3.0 to 5.0 mm under an applied load of 100 kg.

The cover surrounds the solid core and has a two-layer structure consisting of an inner layer and an outer layer. The cover inner layer is composed mainly of an ionomer resin containing an α,β-unsaturated carboxylic acid in a concentration as high as at least 15% by weight.

Examples of the α,β-unsaturated carboxylic acid include acrylic acid, methacrylic acid, maleic acid, and fumaric acid, with methacrylic acid and acrylic acid being preferred.

The ionomer resin contains an α,β-unsaturated carboxylic acid in a high concentration of at least 15% by weight. The content of α,β-unsaturated carboxylic acid in the ionomer resin is preferably 15 to 25% by weight, more preferably 17 to 25% by weight, especially 18.5 to 21.5% by weight. Ionomer resins with α,β-unsaturated carboxylic acid contents of less than 15% by weight have low rigidity and less repulsion whereas ionomer resins with α,β-unsaturated carboxylic acid contents of more than 25% by weight would sometimes become brittle due to too high rigidity.

Appropriate ionomer resins are commercially available as Himilan 1706 and 1605 from Mitsui-DuPont Polychemical K.K., and Surlyn 8220, AM7317, AM7318 and AM7315 from E.I. DuPont. They may be used alone or in admixture of two or more. It is recommended to use a mixture of two or more ionomer resins having different neutralizing metal ions, with the combination of neutralizing metal ions being exemplified by Zn/Na, Mg/Li, and Mg/Na.

Although the hardness of the cover inner layer is not particularly limited, it is recommended that the cover inner layer have a Shore D hardness of 60 to 75, especially 62 to 70. With a Shore D hardness of less than 60, the ball as a whole would not provide sufficient repulsion. With a Shore D hardness of more than 75, the ball would provide a very hard feel when hit. The cover inner layer preferably has a specific gravity of 0.8 to 1.5.

Usually the cover inner layer has a thickness or gage of 0.5 to 3.0 mm, especially 1.0 to 2.0 mm. An inner layer of thinner than 0.5 mm would not exert the effect of controlling the deformation of the underlying core to increase repulsion whereas an inner layer of thicker than 3.0 mm would fail to take full advantage of the repulsion of the core.

The cover outer layer is composed mainly of a thermoplastic elastomer exclusive of an ionomer resin. Suitable thermoplastic elastomers include polyurethane elastomers, polyester elastomers, and polyamide elastomers, which are commercially available under the trade name Hytrel 4047 (polyester elastomer) from Toray-DuPont K.K., Pebax 4033SA00 (polyamide elastomer) from Atochem, and Pandex T7890 (polyurethane elastomer) from Dainippon Ink & Chemicals K.K. They may be used alone or in admixture of two or more. The cover outer layer is usually formed to a specific gravity of 1.0 to 1.5.

Although the hardness of the cover outer layer is not particularly limited, it is recommended that the cover outer layer have a Shore D hardness of 35 to 55, especially 45 to 55, lower than that of the cover inner layer.

Usually the cover outer layer has a thickness or gage of 0.6 to 1.6 mm, especially 0.8 to 1.6 mm. An excessively thin outer layer would exacerbate the durability and feel of the ball whereas an excessively thick outer layer would reduce the repulsion and hence, the flight performance of the ball.

According to the first embodiment of the invention, the golf ball has an adhesive layer interposed between the cover inner layer and the cover outer layer. The adhesive layer firmly bonds the ionomer resin of the inner layer to the thermoplastic elastomer of the outer layer so that the ball may have durability against repetitive hits, spin performance optimized for different clubs, increased flight distance, ease of control, and scuff resistance.

The adhesive used in the adhesive layer is composed mainly of a thermoplastic resin. A choice may be made from among various thermoplastic resins although polymers obtained by graft or random copolymerization of glycidyl methacrylate or an organic acid to an olefinic compound are preferred. The olefinic compounds used herein include ethylene, mixtures of ethylene with ethyl acrylate or methacrylate, and combinations thereof. The organic acids include maleic anhydride and acrylic acid. Exemplary copolymers are ethylene-glycidyl methacrylate copolymers, maleic anhydride-grafted ethylene-ethyl acrylate copolymers, and ethylene-methacrylate-acrylic acid terpolymers. They are commercially available under the trade name Bondfast 2C (ethylene-glycidyl methacrylate copolymer) from Sumitomo Chemical Industry K.K., AR-201 (maleic anhydride-grafted ethylene-ethyl acrylate copolymer) from Mitsui-DuPont Polychemical K.K., and ESCOR ATX325 (ethylene-methacrylate-acrylic acid terpolymer) from Exxon.

No particular limit is imposed on the form of the adhesive. The adhesive is preferably prepared such that an adhesive layer may be readily formed on the cover inner layer. The adhesive may be in any of liquid, paste and solid sheet forms. Accordingly, the adhesive layer may be formed by conventional coating methods such as injection, shaping, and hot-melting. Alternatively, when the adhesive is used in sheet form, the cover inner layer is wrapped with the adhesive sheet.

In the practice of the invention, the adhesive layer may have an appropriate thickness or gage. Usually the adhesive layer has a thickness of 10 $\mu$m to 1.5 mm, especially 10 $\mu$m to 1.0 mm though the invention is not limited thereto. An adhesive layer thinner than 10 $\mu$m would form an insufficient bond whereas an excessively thick adhesive layer would cause a drop of repulsion.

According to the second embodiment of the invention, an adhesive is blended in at least one of the cover stocks of which the cover inner layer and the cover outer layer are made. The adhesive used herein may be the same as described above for the adhesive layer according to the first embodiment.

No particular limit is imposed on the amount of the adhesive blended in the cover stock. In the case of the cover inner layer, usually about 5 to 50 parts, especially about 10 to 30 parts by weight of the adhesive is blended per 100 parts by weight of the base of the cover stock. In the case of the cover outer layer, usually about 5 to 50 parts, especially about 10 to 30 parts by weight of the adhesive is blended per 100 parts by weight of the base of the cover stock. By blending the adhesive in at least one of the inner and outer layer cover stocks, the bond between the cover inner and outer layers is enhanced, insuring satisfactory flight performance and durability. Therefore, if the amount of the adhesive blended in either cover stock is below the above-defined range, the bond between the cover inner and outer layers would become weak with the ball becoming less durable. If the amount of the adhesive blended in either cover stock is above the above-defined range, the ball would become low in repulsion.

The multi-piece solid golf ball of the invention is prepared by preforming a solid core and forming thereon respective layers from respective cover stocks by conventional methods. The methods of forming the respective layers are not critical. In the case of the golf ball of the first embodiment having an adhesive layer between cover inner and outer layers, the solid core is placed in a mold and the inner layer cover stock, adhesive, and outer layer cover stock are injection molded in order. In another method, pairs of hemispherical half-cups are preformed from the inner and outer layer cover stocks, an adhesive layer is formed on the surfaces of the cover inner layer cups, the cover outer layer cups are joined thereover to form a pair of half cups, the solid core is encased in the pair of half cups, and compression molding is effected at 110 to 160° C. for 2 to 10 minutes. Alternatively, the solid core is encased in a pair of half cups preformed of the inner layer cover stock, compression molding is effected at 110 to 160° C. for 2 to 10 minutes, an adhesive layer is formed on the surface of the inner layer, and the outer layer cover stock is injection molded thereon. In order to form the adhesive layer in a more stable manner, it is recommended that the cover inner layer be previously roughened on the surface such as by barrel polishing.

The overall thickness of the cover inner layer, adhesive layer and cover outer layer thus formed is preferably 2.0 to 7.5 mm, especially 2.5 to 3.5 mm. The thickness ratio of cover inner layer : adhesive layer : cover outer layer is preferably from 50:1:50 to 2:1:2.

In the case of the golf ball of the second embodiment having an adhesive blended in the inner and/or outer layer cover stock, the solid core is placed in a mold and the inner layer cover stock and outer layer cover stock are injection molded in order. In another method, pairs of hemispherical half-cups are preformed from the inner and outer layer cover stocks, the cover outer layer cups are joined over the cover inner layer cups to form a pair of half cups, the solid core is encased in the pair of half cups, and compression molding is effected at 110 to 160° C. for 2 to 10 minutes. Alternatively, the solid core is encased in a pair of half cups preformed of the inner layer cover stock, compression molding is effected at 110 to 160° C. for 2 to 10 minutes, and the outer layer cover stock is injection molded thereon. In order to join the outer layer to the inner layer in a more stable manner, it is recommended that the cover inner layer be previously roughened on the surface such as by barrel polishing.

The overall thickness of the cover inner layer and cover outer layer thus formed is preferably 1.0 to 6.0 mm, especially 2.0 to 4.0 mm. The thickness ratio of cover inner layer to cover outer layer is preferably from 1:6 to 6:1.

Desirably, the golf ball of the invention experiences a deflection of 2.3 to 4.5 mm, especially 2.5 to 4.0 mm, under an applied load of 100 kg.

Like conventional golf balls, the multi-piece solid golf ball of the invention is formed with a multiplicity of dimples in the cover surface. The ball usually has about 350 to 500 dimples, preferably about 370 to 480, more preferably 390 to 450 dimples though the number of dimples is not limited thereto. The dimples may include two or more types which are different in diameter and/or depth. Typically, the dimples have a diameter of 1.4 to 4.5 mm, especially 2.0 to 4.3 mm and a depth of 0.15 to 0.25 mm, especially 0.17 to 0.23 mm.

The multi-piece solid golf ball of the invention is prepared in accordance with the Rules of Golf, that is, to a diameter of not less than 42.67 mm and a weight of not greater than 45.93 grams.

There has been described a multi-piece solid golf ball comprising a solid core and a cover consisting of an inner layer mainly of an ionomer resin and an outer layer mainly of a thermoplastic elastomer wherein an adhesive layer is interposed between the cover inner and outer layers, or an adhesive is blended in the inner and/or outer layer cover stock. The golf ball is durable against repetitive hits, improved in spin performance and hence, control in that it acquires a more spin rate on approach shots, but a less spin rate on driver shots, and has increased flight distance and scuff resistance.

EXAMPLE

Examples of the present invention are given below by way of illustration and not by way of limitation. All parts are by weight.

Materials commercially available under the following trade names were used. D is Shore D hardness.

Surlyn AM7317: E.I. DuPont, acid content 18%, zinc type ionomer (D65)

Surlyn AM7318: E.I. DuPont, acid content 18%, sodium type ionomer (D66)

Surlyn AM7315: E.I. DuPont, acid content 20%, zinc type ionomer (D67)

Surlyn 8220: E.I. DuPont, acid content 20%, sodium type ionomer (D68)

Himilan 1706: Mitsui-DuPont Polychemical K.K., acid content 15%, zinc type ionomer (D62)

Himilan 1605: Mitsui-DuPont Polychemical K.K., acid content 15%, sodium type ionomer (D63)

Bondfast 2C: Sumitomo Chemical Industry K.K., ethylene-glycidyl methacrylate copolymer, GMA content 6 wt. %

AR-201: Mitsui-DuPont Polychemical K.K., maleic anhydride-grafted product of ethylene-ethyl acrylate ESCOR ATX325: Exxon, ethylene-methacrylate-acrylic acid terpolymer Hytrel 4047: Toray-DuPont K.K., polyester elastomer (D40)

Pebax 4033SA00: Atochem, polyamide elastomer (D40)

Pandex T7890: Dainippon Ink & Chemicals K.K., polyurethane elastomer (D40)

Examples 1–7 & Comparative Examples 1–4

Solid cores each were prepared by kneading a rubber composition of the formulation shown in Table 1 in a kneader, and placing it in a mold, followed by heat pressure molding at 150° C. for 15 minutes. Parameters of the solid cores are also shown in Table 1.

TABLE 1

| Solid core (pbw) | A | B |
|---|---|---|
| Cis-1,4-polybutadiene[1] | 100 | 100 |
| Zinc diacrylate | 30.5 | 21.5 |
| Zinc oxide | 5 | 26.3 |
| Barium sulfate | 9 | 0 |
| Antioxidant | 0.2 | 0.2 |
| Zinc salt of pentachlorothiophenol[2] | 1 | 1 |
| Dicumyl peroxide | 0.8 | 1 |
| Specific gravity | 1.06 | 1.16 |
| Diameter (mm) | 36.5 | 38.5 |
| Weight (g) | 23.6 | 34.7 |
| Hardness[3] (mm) | 3.6 | 3.4 |

[1]BR01 by Nippon Synthetic Rubber K.K.
[2]Renasit 4 by Bayer AG
[3]a deflection (mm) under a load of 100 kg With each solid core placed in a mold, an inner layer cover stock of the formulation shown in Tables 2 and 3 was injection molded to form a cover inner layer on the core, obtaining an intermediate ball. The intermediate ball was taken out of the mold and roughened on the surface of the cover inner layer by barrel polishing.

The roughened surface of the intermediate ball was wrapped with a 50-μm thick sheet of an adhesive having the formulation shown in Tables 2 and 3. By cutting off extra portions, an adhesive layer was formed on the intermediate ball. The intermediate ball was placed in a mold again, and an outer layer cover stock of the formulation shown in Tables 2 and 3 was injection molded to form a cover outer layer. In this way, multi-piece solid golf balls were completed which had a total number of 432 dimples, a dimple surface coverage of 70%, and a percent dimple volume of 0.9% (calculated as the total of dimple volumes divided by the volume of an imaginary sphere or ball having no dimples on its surface).

It is noted that the ball of Comparative Example 1 was a two-piece solid golf ball in which the solid core in Table 1 was enclosed with one layer of the cover stock in Table 3. The balls of Comparative Examples 2 to 4 were three-piece solid golf balls in which the solid core in Table 1 was enclosed with an inner layer of the cover stock in Table 3 and further with an outer layer of the cover stock in Table 3, without interposing an adhesive layer therebetween. That is, the cover outer layer was formed directly on the surface-roughened cover inner layer in an overlapping manner. The number and arrangement of dimples were the same as above.

By the following tests, the solid golf balls thus prepared were examined for flight performance, spin, control, scuff resistance, and durability against repetitive hits. The results are shown in Tables 2 and 3.

Flight performance

Using a swing robot of True Temper Co., the golf balls were hit with a driver at a head speed of 50 m/sec (HS=50). A spin rate, initial velocity, carry, and total distance were measured. The initial velocity was measured by the method prescribed by USGA.

Spin

The same swing robot as above was used. The golf balls were measured for spin rate when hit with a pitching wedge at a head speed of 20 m/sec (HS=20).

Control

A panel of ten top amateur players made a sensory test. On approach shots with a pitching wedge, the ball was rated for ease of control according to the following criterion.

○: well controllable

Δ: fairly controllable

X: poor

Scuff resistance

Using the swing robot having a pitching wedge mounted, the golf ball was repeatedly hit three times at a head speed of 30 m/s. The surface state of the ball after hitting was visually observed and rated on a 10-point scale by a panel of players. Higher points indicate better surface state, with point 10 being a perfect score.

Durability against repetitive shots

Using the swing robot having a driver mounted, the golf ball was repetitively hit 300 times at a head speed of 45 m/sec (HS=45). The surface state of the ball was visually observed and rated in a relative index based on 100 for Comparative Example 1.

TABLE 2

| | | | Example | | | | | | |
|---|---|---|---|---|---|---|---|---|---|
| | | | 1 | 2 | 3 | 4 | 5 | 6 | 7 |
| Core | A | | ○ | ○ | ○ | ○ | ○ | ○ | ○ |
| | B | | — | — | — | — | — | — | — |
| Cover inner layer composition | Surlyn AM7317 | | 50 | 50 | 50 | 50 | 50 | — | — |
| | Surlyn AM7318 | | 50 | 50 | 50 | 50 | 50 | — | — |
| | Surlyn AM7315 | | — | — | — | — | — | — | 50 |
| | Surlyn 8220 | | — | — | — | — | — | — | 50 |
| | Himilan 1706 | | — | — | — | — | — | 50 | — |
| | Himilan 1605 | | — | — | — | — | — | 50 | — |
| Adhesive layer composition | Bondfast 2C | | 100 | — | — | — | — | — | — |
| | AR-201 | | — | 100 | — | — | — | — | — |
| | ESCOR ATX325 | | — | — | 100 | 100 | 100 | 100 | 100 |
| Cover outer layer composition | Hytrel 4047 | | — | — | — | 100 | — | — | — |
| | Pebax 4033SA00 | | — | — | — | — | 100 | — | — |
| | Pandex T7890 | | 100 | 100 | 100 | — | — | 100 | 100 |
| | Himilan 1706 | | — | — | — | — | — | — | — |
| | Himilan 1605 | | — | — | — | — | — | — | — |
| Intermediate ball | Outer diameter (mm) | | 39.7 | 39.7 | 39.7 | 39.7 | 39.7 | 39.7 | 39.7 |
| | Weight (g) | | 36.0 | 36.0 | 36.0 | 36.0 | 36.0 | 36.0 | 36.0 |
| | Hardness (mm) | | 3.2 | 3.2 | 3.2 | 3.2 | 3.2 | 3.4 | 2.8 |
| | Initial velocity (m/s) | | 78.0 | 78.0 | 78.0 | 78.0 | 78.0 | 77.8 | 78.4 |
| Product ball | Outer diameter (mm) | | 42.7 | 42.7 | 42.7 | 42.7 | 42.7 | 42.7 | 42.7 |
| | Weight (g) | | 45.3 | 45.3 | 45.3 | 45.1 | 45.0 | 45.3 | 45.3 |
| | Hardness (mm) | | 2.8 | 2.8 | 2.8 | 2.8 | 2.8 | 3.0 | 2.8 |
| | Flight test (HS = 50) | Spin (rpm) | 2630 | 2630 | 2630 | 2640 | 2630 | 2550 | 2510 |
| | | Initial velocity (m/s) | 77.0 | 77.0 | 77.0 | 77.2 | 77.1 | 76.8 | 77.3 |
| | | Carry (m) | 230.5 | 230.5 | 230.5 | 231.0 | 230.5 | 229.5 | 232.0 |
| | | Total (m) | 251.0 | 251.0 | 251.0 | 252.0 | 251.0 | 250.5 | 253.0 |
| | Approach test (HS = 20) | Spin (rpm) | 6030 | 6030 | 6030 | 6040 | 6045 | 6030 | 6010 |
| | Control | | ○ | ○ | ○ | ○ | ○ | ○ | ○ |
| | Scuff resistance point | | 8 | 8 | 8 | 7 | 7 | 8 | 7 |
| | Durability index | | 110 | 110 | 110 | 110 | 110 | 110 | 105 |
| | Inner layer | Thickness (mm) | 1.5 | 1.5 | 1.5 | 1.5 | 1.5 | 1.5 | 1.5 |
| | | Specific gravity | 1.0 | 1.0 | 1.0 | 1.0 | 1.0 | 1.0 | 1.0 |
| | | Shore D hardness | 66 | 66 | 66 | 66 | 66 | 63 | 68 |
| | Adhesive | Thickness (μm) | 50 | 50 | 50 | 50 | 50 | 50 | 50 |

TABLE 2-continued

|  |  | Example | | | | | | |
|---|---|---|---|---|---|---|---|---|
|  |  | 1 | 2 | 3 | 4 | 5 | 6 | 7 |
| layer | Specific gravity | 0.9 | 0.9 | 0.9 | 0.9 | 0.9 | 0.9 | 0.9 |
|  | Shore D hardness | 46 | 5 | 30 | 30 | 30 | 30 | 30 |
| Outer | Thickness (μm) | 1.5 | 1.5 | 1.5 | 1.5 | 1.5 | 1.5 | 1.5 |
| layer | Specific gravity | 1.2 | 1.2 | 1.2 | 1.1 | 1.0 | 1.2 | 1.2 |
|  | Shore D hardness | 40 | 40 | 40 | 40 | 40 | 40 | 40 |

TABLE 3

|  |  | Comparative Example | | | |
|---|---|---|---|---|---|
|  |  | 1 | 2 | 3 | 4 |
| Core | A | — | ○ | ○ | ○ |
|  | B | ○ | — | — | — |
| Cover | Surlyn AM7317 | — | 50 | 50 | 50 |
| inner layer | Surlyn AM7318 | — | 50 | 50 | 50 |
| composition | Surlyn AM7315 | — | — | — | — |
|  | Surlyn 8220 | — | — | — | — |
|  | Himilan 1706 | — | — | — | — |
|  | Himilan 1605 | — | — | — | — |
| Adhesive | Bondfast 2C | no adhesive | no | no | no |
| layer | AR-201 | layer | adhesive | adhesive | adhesive |
| composition | ESCOR ATX325 | because of 2-piece | layer | layer | layer |
| Cover | Hytrel 4047 | — | 100 | — | — |
| outer layer | Pebax 4033SA00 | — | — | 100 | — |
| composition | Pandex T7890 | — | — | — | 100 |
|  | Himilan 1706 | 50 | — | — | — |
|  | Himilan 1605 | 50 | — | — | — |
| Intermediate | Outer diameter (mm) | — | 39.7 | 39.7 | 39.7 |
| ball | Weight (g) | — | 36.0 | 36.0 | 36.0 |
|  | Hardness (mm) | — | 3.2 | 3.2 | 3.2 |
|  | Initial velocity (m/s) | — | 78.0 | 78.0 | 78.0 |
| Product | Outer diameter (mm) | 42.7 | 42.7 | 42.7 | 42.7 |
| ball | Weight (g) | 45.3 | 45.3 | 45.3 | 45.3 |
|  | Hardness (mm) | 2.8 | 2.8 | 2.8 | 2.8 |
| Flight | Spin (rpm) | 2400 | 2600 | 2620 | 2610 |
| test | Initial |  |  |  |  |
| (HS = 50) | velocity (m/s) | 77.3 | 76.4 | 76.4 | 76.4 |
|  | Carry (m) | 230.0 | 227.0 | 227.0 | 227.0 |
|  | Total (m) | 250.0 | 247.0 | 247.0 | 247.0 |
| Approach | Spin (rpm) | 4000 | 6000 | 6010 | 6000 |
| test |  |  |  |  |  |
| (HS = 20) |  |  |  |  |  |
|  | Control | x | Δ | Δ | Δ |
|  | Scuff resistance point | 6 | 7 | 6 | 6 |
|  | Durability index | 100 | 75 | 75 | 75 |
| Inner | Thickness (mm) | — | 1.5 | 1.5 | 1.5 |
| layer | Specific gravity | — | 1.0 | 1.0 | 1.0 |
|  | Shore D hardness | — | 66 | 66 | 66 |
| Adhesive | Thickness | no adhesive | no | no | no |
| layer | Specific gravity | layer | adhesive | adhesive | adhesive |
|  | Shore D hardness | because of 2-piece | layer | layer | layer |
| Outer | Thickness (mm) | 2.0 | 1.5 | 1.5 | 1.5 |
| layer | Specific gravity | 1.0 | 1.1 | 1.0 | 1.2 |
|  | Shore D hardness | 63 | 40 | 40 | 40 |

It is noted that the hardness of the intermediate or product ball is expressed by a deflection (mm) under a load of 100 kg.

Since the adhesive layer establishes a firm bond between the cover inner and outer layers, the multi-piece solid golf balls of the invention are improved in control in that they receive a more spin rate upon approach shots and a less spin rate upon driver shots. The spin rate upon driver shots is appropriate for the ball to fly an increased distance of travel. The balls are also resistant to scuffing upon iron shots and fully durable against repetitive hits.

In contrast, due to the lack of an adhesive layer, the comparative golf balls are inferior in all factors to the inventive golf balls. In particular, the two-piece solid golf ball of Comparative Example 1 receives lower spin rates upon both driver and iron shots, and is difficult to control and less durable. The three-piece solid golf balls of Comparative Examples 2 to 4 which have the same cover inner and outer layers as in the inventive balls, but lack an adhesive layer are extremely poor in durability and scuff resistance.

Examples 8–14 & Comparative Examples 5–8

As in Examples 1–7 and Comparative Examples 1–4, solid cores were prepared from the rubber compositions shown in Table 1.

With each solid core placed in a mold, an inner layer cover stock of the formulation shown in Tables 4 and 5 was injection molded to form a cover inner layer on the core, obtaining an intermediate ball. The intermediate ball was taken out of the mold and roughened on the surface of the cover inner layer by barrel polishing.

The intermediate ball with roughened surface was placed in a mold again, and an outer layer cover stock of the formulation shown in Tables 4 and 5 was injection molded to form a cover outer layer. In this way, multi-piece solid golf balls were completed which had a total number of 432 dimples, a dimple surface coverage of 70%, and a percent dimple volume of 0.9% (calculated as the total of dimple volumes divided by the volume of an imaginary sphere or ball having no dimples on its surface).

It is noted that the ball of Comparative Example 5 was a two-piece solid golf ball in which the solid core in Table 1 was enclosed with one layer of the cover stock in Table 5. The number and arrangement of dimples were the same as above.

By the same tests as in the foregoing Examples, the solid golf balls thus prepared were examined for flight performance, spin, control, scuff resistance, and durability against repetitive hits. The results are shown in Tables 4 and 5.

TABLE 4

| | | | Example | | | | | | |
|---|---|---|---|---|---|---|---|---|---|
| | | | 8 | 9 | 10 | 11 | 12 | 13 | 14 |
| Core | A | | ○ | ○ | ○ | ○ | ○ | ○ | ○ |
| | B | | — | — | — | — | — | — | — |
| Cover inner layer composition | Surlyn AM7317 | | 45 | 45 | 45 | 50 | 50 | — | — |
| | Surlyn AM7318 | | 45 | 45 | 45 | 50 | 50 | — | — |
| | Surlyn AM7315 | | — | — | — | — | — | — | 50 |
| | Surlyn 8220 | | — | — | — | — | — | — | 50 |
| | Himilan 1706 | | — | — | — | — | — | 45 | — |
| | Himilan 1605 | | — | — | — | — | — | 45 | — |
| | Bondfast 2C | | 10 | — | — | — | — | — | — |
| | AR-201 | | — | 10 | — | — | — | — | — |
| | ESCOR ATX325 | | — | — | 10 | — | — | 10 | — |
| Cover outer layer composition | Hytrel 4047 | | — | — | — | 90 | — | — | — |
| | Pebax 4033SA00 | | — | — | — | — | — | — | — |
| | Pandex T7890 | | 90 | 90 | 90 | — | — | 100 | 90 |
| | Bondfast 2C | | 10 | — | — | 10 | — | — | — |
| | AR-201 | | — | 10 | — | — | — | — | — |
| | ESCOR ATX325 | | — | — | 10 | — | 10 | — | 10 |
| Intermediate ball | Outer diameter (mm) | | 39.7 | 39.7 | 39.7 | 39.7 | 39.7 | 39.7 | 39.7 |
| | Weight (g) | | 36.0 | 36.0 | 36.0 | 36.0 | 36.0 | 36.0 | 36.0 |
| | Hardness (mm) | | 3.2 | 3.2 | 3.2 | 3.0 | 3.2 | 3.4 | 2.8 |
| | Initial velocity (m/s) | | 78.0 | 78.0 | 78.0 | 78.2 | 78.2 | 77.8 | 78.5 |
| Product ball | Outer diameter (mm) | | 42.7 | 42.7 | 42.7 | 42.7 | 42.7 | 42.7 | 42.7 |
| | Weight (g) | | 45.3 | 45.3 | 45.3 | 45.1 | 45.0 | 45.3 | 45.3 |
| | Hardness (mm) | | 2.9 | 2.9 | 2.9 | 2.8 | 2.8 | 3.0 | 2.8 |
| | Flight test (HS = 50) | Spin (rpm) | 2640 | 2640 | 2640 | 2650 | 2640 | 2560 | 2510 |
| | | Initial velocity (m/s) | 77.0 | 77.0 | 77.0 | 77.0 | 77.0 | 76.8 | 77.2 |
| | | Carry (m) | 230.5 | 230.5 | 230.5 | 231.0 | 230.5 | 229.5 | 232.0 |
| | | Total (m) | 251.0 | 251.0 | 251.0 | 252.0 | 251.0 | 250.5 | 253.0 |
| | Approach test (HS = 20) | Spin (rpm) | 6030 | 6030 | 6030 | 6040 | 6045 | 6030 | 6010 |
| | Control | | ○ | ○ | ○ | ○ | ○ | ○ | ○ |
| | Scuff resistance point | | 8 | 8 | 8 | 7 | 7 | 8 | 7 |
| | Durability index | | 110 | 110 | 110 | 110 | 110 | 110 | 105 |
| | Inner layer | Thickness (mm) | 1.5 | 1.5 | 1.5 | 1.5 | 1.5 | 1.5 | 1.5 |
| | | Specific gravity | 1.0 | 1.0 | 1.0 | 1.0 | 1.0 | 1.0 | 1.0 |
| | | Shore D hardness | 64 | 64 | 64 | 66 | 66 | 61 | 68 |
| | Outer layer | Thickness (mm) | 1.5 | 1.5 | 1.5 | 1.5 | 1.5 | 1.5 | 1.5 |
| | | Specific gravity | 1.1 | 1.1 | 1.1 | 1.1 | 1.1 | 1.1 | 1.1 |
| | | Shore D hardness | 40 | 40 | 40 | 40 | 40 | 40 | 40 |

TABLE 5

| | | Comparative Example | | | |
|---|---|---|---|---|---|
| | | 5 | 6 | 7 | 8 |
| Core | A | — | ○ | ○ | ○ |
| | B | ○ | — | — | — |
| Cover inner layer composition | Surlyn AM7317 | — | 50 | 50 | 50 |
| | Surlyn AM7318 | — | 50 | 50 | 50 |
| | Surlyn AM7315 | — | — | — | — |
| | Surlyn 8220 | — | — | — | — |
| | Bondfast 2C | — | — | — | — |
| | AR-201 | — | — | — | — |
| | ESCOR ATX325 | — | — | — | — |

TABLE 5-continued

|  |  | Comparative Example | | | |
|---|---|---|---|---|---|
|  |  | 5 | 6 | 7 | 8 |
| Cover outer layer composition | Himilan 1706 | 50 | — | — | — |
|  | Himilan 1605 | 50 | — | — | — |
|  | Hytrel 4047 | — | 100 | — | — |
|  | Pebax 4033SA00 | — | — | 100 | — |
|  | Pandex T7890 | — | — | — | 100 |
|  | Bondfast 2C | — | — | — | — |
|  | AR-201 | — | — | — | — |
|  | ESCOR ATX325 | — | — | — | — |
| Intermediate ball | Outer diameter (mm) | — | 39.7 | 39.7 | 39.7 |
|  | Weight (g) | — | 36.0 | 36.0 | 36.0 |
|  | Hardness (mm) | — | 3.2 | 3.2 | 3.2 |
|  | Initial velocity (m/s) | — | 78.0 | 78.0 | 78.0 |
| Product ball | Outer diameter (mm) | 42.7 | 42.7 | 42.7 | 42.7 |
|  | Weight (g) | 45.3 | 45.3 | 45.3 | 45.3 |
|  | Hardness (mm) | 2.8 | 2.8 | 2.8 | 2.8 |
| Flight test (HS = 50) | Spin (rpm) | 2400 | 2600 | 2620 | 2610 |
|  | Initial velocity (m/s) | 77.3 | 76.4 | 76.4 | 76.4 |
|  | Carry (m) | 230.0 | 227.0 | 227.0 | 227.0 |
|  | Total (m) | 250.0 | 247.0 | 247.0 | 247.0 |
| Approach test (HS = 20) | Spin (rpm) | 4000 | 6000 | 6010 | 6000 |
|  | Control | x | Δ | Δ | Δ |
|  | Scuff resistance point | 6 | 7 | 6 | 6 |
|  | Durability index | 100 | 75 | 75 | 75 |
| Inner layer | Thickness (mm) | — | 1.5 | 1.5 | 1.5 |
|  | Specific gravity | — | 1.0 | 1.0 | 1.0 |
|  | Shore D hardness | — | 66 | 66 | 60 |
| Outer layer | Thickness (mm) | 2.0 | 1.5 | 1.5 | 1.5 |
|  | Specific gravity | 1.0 | 1.1 | 1.0 | 1.2 |
|  | Shore D hardness | 63 | 40 | 40 | 40 |

It is noted that the hardness of the intermediate or product ball is expressed by a deflection (mm) under a load of 100 kg.

Since the adhesive blended in the inner and/or outer cover stock establishes a firm bond between the cover inner and outer layers, the multi-piece solid golf balls of the invention are improved in control in that they receive a more spin rate upon approach shots and a less spin rate upon driver shots. The spin rate upon driver shots is appropriate for the ball to fly an increased distance of travel. The balls are also resistant to scuffing upon iron shots and fully durable against repetitive hits.

In contrast, the two-piece solid golf ball of Comparative Example 5 receives lower spin rates upon both driver and iron shots, and is difficult to control and less durable. The three-piece solid golf balls of Comparative Examples 6 to 8 which lack an adhesive in the cover inner and outer layers are extremely poor in durability and scuff resistance.

Japanese Patent Application Nos. 329456/1997 and 329457/1997 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A multi-piece solid golf ball comprising a solid core and a two-layer structure cover on the solid core consisting of a cover inner layer and a cover outer layer, wherein an adhesive layer having a thickness of 10 $\mu$m to 1.5 mm and composed mainly of a thermoplastic resin is interposed between the cover inner layer and the cover outer layer, said cover inner layer has a thickness of 0.5 to 3.0 mm and is composed mainly of an ionomer resin containing at least 15% by weight of an $\alpha,\beta$-unsaturated carboxylic acid, said cover outer layer has a thickness of 0.6 to 1.6 mm and is composed mainly of a thermoplastic elastomer exclusive of an ionomer resin, and the adhesive in said adhesive layer is selected from the group consisting of a polymer obtained by graft copolymerizing glycidyl methacrylate to an olefinic compound, a polymer obtained by random copolymerizing glycidyl methacrylate to an olefinic compound, a polymer obtained by graft copolymerizing an organic acid to an olefinic compound, and a polymer obtained by random copolymerizing an organic acid to an olefinic compound.

2. The multi-piece solid golf ball of claim 1 wherein said cover inner layer has a Shore D hardness of 60 to 75, and said cover outer layer is composed mainly of at least one elastomer selected from the group consisting of polyurethane elastomers, polyester elastomers and polyamide elastomers and has a Shore D hardness of 35 to 55.

3. The multi-piece solid golf ball of claim 1 wherein said adhesive is an ethylene-glycidyl methacrylate copolymer, maleic anhydride-grafted ethylene-ethyl acrylate copolymer, or ethylene-methacrylate-acrylic acid terpolymer.

4. The multi-piece solid golf ball of claim 1 wherein said organic acid is selected from the group consisting of maleic anhydride and acrylic acid.

5. The multi-piece solid golf ball of claim 1 wherein said olefinic compound is selected from the group consisting of ethylene, mixtures of ethylene with ethyl acrylate and mixtures of ethylene with methacrylate.

* * * * *